(12) United States Patent
Tyvoll

(10) Patent No.: US 6,572,226 B2
(45) Date of Patent: Jun. 3, 2003

(54) ANISOTROPIC COLORANTS FOR INKJET PRINTING

(75) Inventor: David Tyvoll, La Jolla, CA (US)

(73) Assignee: Hewlett Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/845,870

(22) Filed: Apr. 30, 2001

(65) Prior Publication Data

US 2002/0158951 A1 Oct. 31, 2002

(51) Int. Cl.⁷ .................................................. B41J 2/01
(52) U.S. Cl. ..................... 347/100; 347/101; 347/95; 347/96; 106/31.6
(58) Field of Search ......................... 347/100, 101, 347/96, 95; 106/31.58, 31.6, 31.13; 523/160

(56) References Cited

U.S. PATENT DOCUMENTS

| | | | | |
|---|---|---|---|---|
| 5,205,861 A | * | 4/1993 | Matrick | 347/100 |
| 5,221,334 A | * | 6/1993 | Ma et al. | 347/100 |
| 5,554,739 A | | 9/1996 | Belmont | |
| 5,571,311 A | | 11/1996 | Belmont et al. | |
| 5,630,868 A | | 5/1997 | Belmont et al. | |
| 5,707,432 A | | 1/1998 | Adams et al. | |
| 5,866,285 A | * | 2/1999 | Anderson et al. | 430/41 |
| 5,990,202 A | * | 11/1999 | Nguyen et al. | 523/201 |
| 6,057,384 A | * | 5/2000 | Nguyen et al. | 523/160 |
| 6,169,129 B1 | | 1/2001 | Mahmud et al. | |
| 6,214,100 B1 | * | 4/2001 | Parazak et al. | 106/31.6 |
| 6,221,142 B1 | * | 4/2001 | Wang et al. | 106/31.6 |

* cited by examiner

Primary Examiner—Raquel Yvette Gordon
Assistant Examiner—Manish Shah
(74) Attorney, Agent, or Firm—Michael D. Jones

(57) ABSTRACT

The present invention relates to anisotropic colorants and ink-jet ink compositions that include the anisotropic colorants. These anisotropic colorants are highly stable and can be designed to provide enhanced chroma, gloss, gloss uniformity, smearfastness, print quality, drytime, and improved resistance to water when applied to a media. Moreover, inks formulated with these new colorants are useful in ink-jet printing, including thermal ink jet printing, piezoelectric ink jet printing, and continuous ink jet printing.

16 Claims, No Drawings

ANISOTROPIC COLORANTS FOR INKJET PRINTING

TECHNICAL FIELD

The present invention relates to anisotropic colorants and ink-jet ink compositions that comprise the anisotropic colorants. These anisotropic colorants are highly stable and can be designed to provide enhanced chroma, gloss, gloss uniformity, smearfastness, print quality, drytime, and improved resistance to water when applied to a media. Moreover, inks formulated with these new colorants are useful in ink-jet printing, including thermal ink jet printing, piezoelectric ink jet printing, and continuous ink jet printing.

BACKGROUND ART

Most colorants used commercially are either discreet dyes or dispersed pigments. In the case of the latter, the pigment particle is typically either dispersed with polymers (through non-covalent interactions), or modified covalently with solubilizing moieties (forming "self-dispersed" pigments). In neither instance is the resulting spatial homogeneity (or inhomogeneity) of the discreet particle a consideration.

This necessarily dictates that no order or structuring of the colorants on the printed substrate can subsequently be imposed. This is an important point, because it places hard limits on certain performance attributes of the pigments, in particular chroma and gloss (and gloss uniformity). Pigments are well known in the industry to be inferior to dyes with respect to chroma and gloss on non-specialized media. Part of this lack of performance can be attributed directly to the amorphous nature of the pigment itself and the consequent amorphous nature of the pigment ensemble on the substrate.

Ink-jet printers offer a low cost, high quality, and comparatively noise-free option to other types of printers commonly used with computers. Such printers employ a resistor element in a chamber provided with an egress for ink to enter from a plenum. The plenum is connected to a reservoir for storing the ink. A plurality of such resistor elements are arranged in a particular pattern, called a primitive, in a printhead. Each resistor element is associated with a nozzle in a nozzle plate, through which ink is expelled toward a print medium. The entire assembly of printhead and reservoir comprise an ink-jet pen.

On operation, each resistor element is connected via a conductive trace to a microprocessor, where current-carrying signals cause one or more selected elements to heat up. The heating creates a bubble of ink in the chamber, which is expelled through the nozzle toward the print medium. In this way, firing of a plurality of such resistor elements in a particular order in a given primitive forms alphanumeric characters, performs area-fill, and provides other print capabilities on the medium.

Ink-jet inks used in thermal ink-jet printing typically comprise a colorant and a vehicle, with the vehicle often containing water and other relatively low surface tension liquids.

As noted above, there are two general classifications of colorants: dye-based and pigment-based. Dyes have the advantage of being water-soluble. However, problems with dyes include poor waterfastness, poor smearfastness, poor bleed control between colors, and poor lightfastness. Pigments are generally water-insoluble and require a dispersant or other means to make it soluble in water. For the non-covalently dispersed pigments, the nature of the dispersant and the mass ratio of pigment to dispersant are the factors that are controlled. For the self-dispersed pigments, the nature of the covalently-attached solubilizing groups and their density on the pigment surface are the factors that are controlled. From the colorant's frame of reference, these modifications are spatially random by their nature. The resulting pigments are thus a statistical ensemble of the dispersion processes.

Although the relevant art contains many examples of ink-jet ink formulations using these colorants, a need exists for ink compositions comprising stable, water soluble colorants which provide improved chroma, gloss, gloss uniformity, smearfastness, print quality, drytime, and improved resistance to water when applied to a media.

DISCLOSURE OF INVENTION

In accordance with the invention, an ink-jet ink composition is provided which comprises a colorant that is both water-soluble and contains discreet, specifically attached substituents on the colorant particle. These attachments may be homogeneously or inhomogeneously arranged on the particle; however the attachments are not randomly attached like typical pigments used heretofore.

In this embodiment, colorants are synthesized, dispersed, or modified in such a fashion that the resulting discreet particles are anisotropic with respect to their dispersants, polymers, or other attached additives. In other words, on a microscopic or molecular level, one or more "sides" or "faces" of the particle are purposefully chemically/physically distinct from another face or faces. Restating this, the dispersion process is now meant to impart anisotropy, distinct morphology, and/or chirality to the pigment. This is done with the purpose to impart 2- and 3-dimensional structure to the resulting printed substrate.

By creating anisotropic colorants, and thereby influencing the resulting orientation of the particles on the substrate, it is possible to change the surface energy of the printed substrate to a substantial degree. This results in improvements to properties such as improved waterfastness, smearfastness, chroma, and gloss.

One can design specific sites or faces on the colorant to interact preferentially with the substrate, the environment, or both. Surfactant-like molecules may be attached to one side of the colorants to "anchor" it to the substrate, while hydrophobic or non-wetting moieties (fluoropolymers, siloxanes, etc.) can be designed to be present on the surface.

There are several ways that the colorants of this invention may be dispersed anisotropically. While these methods are known in art of molecule design and synthesis, examples include:

- the presence of steric bulk on a dispersant, such that the region around the attachment site is no longer available for subsequent reactions. This may also be envisioned as a partial encapsulation.
- the use of biphasic or heterogeneous reactions, in which only part of the pigment surface is exposed toward the reactants.
- modification of the entire surface of a larger particle with subsequent break up, thereby exposing unreacted surfaces.

Inks comprising these anisotropic colorants are very effective in reducing smear and have increased waterfastness, gloss, gloss uniformity, and improved print quality. The ink may contain further components to aid in providing improved print quality and performance in an ink-jet printer.

Additionally, a method of ink-jet printing which uses the disclosed inks and exploits the inks' properties is provided.

All concentrations herein are in weight percent, unless otherwise indicated. The purity of all components is that employed in normal commercial practice for ink-jet inks. All references are hereby incorporated by reference.

BEST MODES FOR CARRYING OUT THE INVENTION

One example of anisotropic colorants useful herein include modified black pigments obtained from colorant vendors such as Cabot Corp. and Orient Chemical. Many pigments are useful in the practice of this invention. The following pigments comprise a partial list of useful colorants in this invention.

Paliogen® Orange, Heliogen® Blue L 6901F, Heliogen® Blue NBD 7010, Heliogen® Blue K 7090, Heliogen® Blue L 7101F, Paliogen® Blue L 6470, Heliogen® Green K 8683, and Heliogen® Green L 9140, are all available from BASF Corp.

The following pigments are available from Cabot: Monarch® 1400, Monarch® 1300, Monarch® 1100, Monarch® 1000, Monarch® 900, Monarch® 880, Monarch® 800, and Monarch® 700.

The following pigments are available from Ciba: Chromophtal® Yellow 3G, Chromophtal® Yellow GR, Chromophtal® Yellow 8G, Igrazin®D Yellow 5GT, Igralite® Rubine 4BL, Monastral® Magenta, Monastral® Scarlet, Monastral® Violet R, Monastral® Red B, and Monastral® Violet Maroon B.

The following pigments are available from Columbian: Raven 7000, Raven 5750, Raven 5250, Raven 5000, and Raven 3500. The following pigments are available from Degussa: Color Black FW 200, Color Black FW 2, Color Black FW 2V, Color Black FW 1, Color Black FW 18, Color Black S160, Color Black FW S170, Special Black 6, Special Black 5, Special Black 4A, Special Black 4, Printex U, Printex 140U, Printex V, and Printex 140V. Tipure® R-101 is available from Dupont. The following pigments are available from Heubach: Dalamar® Yellow YT-858-D and Heucophthal® Blue G XBT 583D. The following pigments are available from Hoechst: Permanent Yellow GR, Permanent Yellow G, Permanent Yellow NCG-71, Permanent Yellow GG, Hansa Yellow RA, Hansa Brillant Yellow 5GX-02, Hansa Yellow-X, Novoperm® Yellow HR, Novoperm® Yellow FGL, Hansa Brilliant Yellow 10GX, Permanent Yellow G3R-01, Hostaperm® Yellow H4G, Hostaperm® Yellow H3G, Hostaperm® Orange GR, Hostaperm® Scarlet GO, and Permanent Rubine F6B. The following pigments are available from Mobay: Quindo® Magenta, Indofast® Brilliant Scarlet, Quindo® Red R6700, Quindo® Red R6713, Indofast® Violet. The following pigments are available from Sun Chemical: L74-1357 Yellow, L75-1331 Yellow, and L75-2577 Yellow.

For instance, the anisotropic colorants for use in the present ink formula may comprise chemical modifications to impart water solubility to the particle. Under typical chemical processes, the resulting surface of the pigment consists of randomly placed hydrophilic substituents, such as carboxylate, phosphate, and/or sulfonate functionalities for anionic pigments, and ammonium, quaternary ammonium, or phosphonium functionalities for cationic pigments. For this invention the water solubility substituents would be covalently attached on the pigment particle in discreet locations on the surface, while a hydrophobic substituent could be placed in specially selected sites adjacent to or opposing the hydrophilic sites. Thus allowing the pigment to be water soluble and suitable for ink-jet ink formulations, yet when applied to the media to spatially arrange itself such that the hydrophobic side provided waterfastness to the printed ink.

See U.S. Pat. Nos. 5,707,432; 5,630,868; 5,571,311; and 5,554,739 for a discussion of modified carbon black pigments and methods of attaching the functionalized groups.

To be useful in ink formulations to be ink-jettable, the colorant particles of the present invention preferably have a useful mean diameter ranging from about 0.005 to about 12 um. Colorants of this type result from chemical reactions where solvent-accessible functional groups are derivatized to provide solubilizing groups that render the colorant soluble in water.

Ink-jet Ink Vehicle—The ink compositions of this invention comprise the anisotropic colorants above plus a vehicle. For a discussion of inks and their properties, see *The Printing Manual*, $5^{th}$ ed. Leach et al. (Chapman and Hall, 1993). See also U.S. Pat. Nos. 2,833,736; 3,607,813; 4,104,061; 4,770,706; and 5,026,755. Examples of components in the ink vehicle include surfactants, co-solvents, buffers, biocides, colloids, viscosity modifiers, and mixtures thereof.

The inks of the present invention typically comprise about 1 to about 20 wt % water-miscible organic co-solvent. More preferably, the inks comprise about 3 to 15 wt % organic co-solvent.

The water-miscible organic co-solvents suitably employed in the practice of the present invention include any of, or a mixture of two or more of, such compounds as nitrogen-containing ketones, such as 2-pyrrolidone, N-methyl-pyrrolid-2-one (NMP), 1,3-dimethylimidazolid-2-one, and octyl-pyrrolidone; diols such as ethanediols (e.g., 1,2-ethanediol), propanediols (e.g., 1,2-propanediol, 1,3-propanediol, 2-ethyl-2-hydroxymethyl-1,3-propanediol, ethylhydroxy-propanediol (EHPD)), butanediols (e.g., 1,2-butanediol, 1,3-butanediol, 1,4-butanediol), pentanediols (e.g., 1,2-pentanediol, 1,5-pentanediol), hexanediols (e.g., 1,2-hexanediol, 1,6-hexanediol, 2,5-hexanediol), heptanediols (e.g., 1,2-heptanediol, 1,7-heptanediol), octanediols (e.g., 1,2-octanediol, 1,8-octanediol); alcohols, such as $C_3$–$C_6$ alcohols (e.g., propanol, butanol, pentanol, and hexanol), including isomers thereof (e.g., 1-propanol and 2-propanol); glycol ethers and thioglycol ethers commonly employed in ink-jet inks, such as polyalkylene glycols such as polyethylene glycols (e.g., diethylene glycol (DEG), triethylene glycol, tetraethylene glycol), propylene glycols (e.g., dipropylene glycol, tripropylene glycol, tetrapropylene glycol), polymeric glycols (e.g., PEG 200, PEG 300, PEG 400, PPG 400), and thiodiglycol. Additional co-solvents include hydantoins (glycol ureas) and derivatives thereof, such as a hydantoin containing ethyl hydroxide and methyl groups, available from Lonza, Inc. as Dantocol DHE, and polyalkoxylated triols, such as Multranol 4012, which is a polyalkoxylated triol having a molecular weight of about 440, available from Bayer.

Other classes of cosolvents employed in the practice of this invention include, but are not limited to, caprolactams, formamides, acetamides, and long chain alcohols.

Preferably, the organic co-solvent comprises a mixture of 2-pyrrolidone and 1,6-hexanediol.

Buffers optionally employed in the practice of this invention to modulate pH can be organic-based biological buffers or inorganic buffer, preferably organic-based. Examples of buffers include tris(hydroxymethyl)aminomethane, available from companies such as Aldrich Chemical (Milwaukee, Wis.), 4-morpholineethanesulfonic acid (MES), and 4-morpholinepropanesulfonic acid (MOPS).

Metal chelators optionally employed in the practice of this invention are used to bind transition metal cations that may be present in the ink. Examples of preferably-employed metal chelators include: EDTA, Diethylenetetraaminepentaacetic acid (DTPA), trans-1,2-diaminocyclohexanetetraacetic acid (CDTA), (ethylenedioxy) diethylene dinitrilotetraacetic acid (EGTA), malonic acid, salicylic acid, or other chelators that can bind transition metal cations.

Any of the biocides commonly employed in inkjet ink may optionally be employed in the practice of this invention, such as Nuosept 95, available from Huls America (Piscataway, N.J.); Proxel GXL, available from Zeneca (Wilmington Del.); and glutaraldehyde, available from Union Carbide Company (Bound Brook, N.J.) under the trade designation Ucarcide 250.

The color inks of the present invention may further comprise one or more surfactants, the total surfactant concentration ranging from about 0.05 to 6 wt %. The surfactant mixture may comprises anionic, non-ionic, amphoteric, and fluoro-surfactants. U.S. Pat. No. 5,106,416, discloses more fully most of the surfactants listed above.

One example of a suitable non-ionic surfactant includes the SURFYNOL series, which are acetylenic ethoxylated diols available from Air Products. Another example of a suitable non-ionic surfactant includes the TERGITOL series, which are polyethylene or polypropylene oxide ethers available from Union Carbide.

One example of a suitable anionic surfactant includes the DOWFAX series, which are diphenyl sulfonate derivatives available from Dow Chemical. Another example of a suitable anionic surfactant is the OT series, which are dioctyl sodium sulfosuccinates available from Cytec Ind.

Preferred fluoro-surfactants include ZONYL FSA, ZONYL FS-62, and FLUORAD FC-129.

A typical formulation for an ink useful in the practice of the invention includes the colorant (about 0.001% to 10 wt %), one or more cosolvents, one or more water-soluble surfactants/amphiphiles, optionally one or more high molecular weight colloids (0 to about 3 wt %), and water (balance).

Between 0 and about 3 wt % of a high molecular weight colloid derived from natural or synthetic sources may optionally be added to the ink formulation. Addition of a high molecular weight colloid improves print quality. Example of high molecular weight colloids employed in the practice of this invention include alginates, mannuronic acid, carageenan, guar gum, xanthan gum, dextran, chitin, chitosan, carboxymethylcellulose, nitromethylcellulose, and all derivatives thereof. These colloids are disclosed in U.S. Pat. No. 5,133,803, "High Molecular Weight Colloids for Bleed Control." The preferred concentration of the high molecular weight component colloid in the inks of this invention is from 0% to about 0.75 wt %.

Other known additives such as viscosity modifiers and other acrylic or non-acrylic polymers may be added to improve various properties of the ink compositions as desired.

The inks are formulated by combining the various components of the vehicle and mixing them with the colorants disclosed herein. Ink formulations which employee the colorants generally have a pH from about 3 to about 12. The viscosity of the final ink composition is from about 0.8 to about 8 cps, preferably from about 0.9 to about 4 cps.

A method of ink-jet printing is also disclosed herein. The inks of this invention may be used in any conventional ink-jet or bubble-jet or piezoelectric printer. Preferably the inks are used in thermal ink-jet printers. The ink is typically charged into a printer cartridge and printed on any medium. Examples of suitable media for printing includes paper, textiles, wood, and plastic.

EXAMPLES

Example 1

Synthesis of a carbon black pigment with 75% of a hydrophilic moiety and 25% of a fluorinated, hydrophobic moiety Normally, attachment methodologies will result in fluorinated moieties interspersed randomly throughout the mostly hydrophilic pigment surface. (See U.S. Pat. Nos. 6,221,142 and 6,214,100, both assigned to Hewlett-Packard Co.). In contrast, the same pigment with 75:25 balance of hydrophilic and fluorinated moieties can be synthesized wherein the fluorination is localized to a region on the particle surface. This involves a two step attachment process. The first step involves attaching one or more hydrophilic moities (polyacrylates, for example) to the surface of the pigment. Possible reactions that can be used include amidations, acylations, and additions to vinyl sulfones. The reaction is run so as not to saturate all the reactive sites on the surface. Then, a second reaction is applied, in which a fluoropolymer is introduced and reacts with a small number (including one) of the remaining sites on the surface. In this case, the fluoropolymer should be large. With the correct balance of pigment solubility and solvent mixture (including ionic strength), a single attachment of a hydrophobic moiety is made, and the resulting pigment precipitates from solution and is effectively shielded from further reactions. Alternatively, higher amounts of the hydrophilic moiety are attached in the first step, with a concomitant decrease in the number of available sites for the second reaction. Controlling the stoichiometry of the second reaction leads to predominately single attachments of the fluoropolymer. Both methods lead to the creation of anisotropic particles. By engineering the wetting properties of the pigment, it is possible to orient the pigment on the substrate preferentially, in this example with the fluorination exposed to the environment.

Example 2

Analogous to the previous example, except that the first and subsequent attachment steps utilize different chemical reactions or different reactivities. In this example, the first attachment step utilizes an amidation reaction, and the second step an acylation. Likewise, both reactions involve nucleophilic displacement, but the attachment groups have different nucleophilicity. Both examples provide a means to control the amount and type of moiety attached to the particle.

Example 3

Analogous to the previous examples, except that the fluoropolymer is replaced with a latex moiety, silicon-containing moiety, or some other hydrophobic moiety that will preferentially orient towards the air interface.

The pigments of the above examples exhibit enhanced waterfastness, smudgefastness, improve bleed performance, drytime, etc. Other examples of substitutents include polyvinylpyrrolidone, polyvinylalcohol, polysaccharides, and metal chelators.

Example 4

In this example, the first step of the surface modification in the above examples is conducted on the entire particle surface. In this case, however, the modified pigment is subsequently milled or broke-up to expose fresh, internal surfaces. Accordingly, the beginning particle size of the pigment is larger than those utilized in the above examples. See U.S. Pat. No. 6,169,129, assigned to Cabot, which describes the synthesis of silicon-treated carbon blacks in which a silicon compound is introduced simultaneously into the carbon black-forming feedstock: "In this case the carbon black aggregates are obtained in which silicon or a silicon-containing species is present primarily at or near the surface of the carbon black aggregate . . . Silicon-treated carbon black aggregates of the present invention are not a mixture of discrete carbon black aggregates and discrete silica aggregates, but include at least one silicon-containing region either at the surface of or within the carbon black aggregate." Other chemistries besides silicon moieties can be utilized in this step. Regardless, further break-up of the aggregate is required to expose unmodified pigment surfaces. These fresh surfaces can then be modified, appropriately, with other substituents to create the functional, anisotropic particles desired.

Unlike the carbon black example, in which the modification is occurring during the actual synthesis of the pigment, this concept can be applied to larger particles in general, including color pigments. For example, the entire surface of a 500 nanometer phthalocyanine pigment sample can be modified with dodecylamine using existing attachment technology known to those skilled in the art. By subsequent milling, these particles are reduced in size (i.e. 200 nanometer diameter) with exposure of internal surfaces for further modification. The resulting particle thus has a localized region of hydrocarbon on its surface, as well as surfaces modified with other, distinct chemical species.

Other means exist which utilize biphasic liquid reactions or chemical vapor deposition on dry pigment particles. Yet another means to impart anisotropy includes entire encapsulation of the particle with a "so-called" core-shell polymer. (See U.S. Pat. Nos. 5,990,202 and 6,057,384, both assigned to Hewlett-Packard Co.).

And in yet another method, more complex solutions are found in crystallization technology. Here, a pigment particle is synthesized from crystallization of discreet molecules. Synthesizing particles from a "bottoms-up" approach is a field still in its infancy yet examples can be found in the pharmaceutical industry and in the formulation of new pigments for the paint industry. By choosing the molecule judiciously, and controlling the crystallization conditions, it is possible to obtain single crystals of largely monodisperse particles. In this case, the anisotropy of the particles is inherent. Here the particles can be used as-is, or their anisotropy can be utilized for further selective chemical modification. For instance, the crystal can have a single face terminating in carboxylic acids. These can be amidated selectively with n-hexyl amine, to yield particles with discreet domains of hydrocarbon attached via amide bonds. As a corollary to this method, molecular modeling techniques provide means to modify specific faces of a crystal. Usually this technique is used to enhance or slow down the growth of a specific face of a crystal. Here it is used to discover chemical additives which interact with a specific crystal face. By imposing chemical anisotropy on the particle, the physical properties of specific faces or domains of the particle are thereby altered.

INDUSTRIAL APPLICABILITY

The inclusion of the anisotropic colorants described above is expected to find use in inks employed in ink-jet printing.

What is claimed is:

1. An ink for use in inkjet printing comprising one or more anisotropic colorants wherein said anisotropic colorants of said ink comprises a pigment having a surface modified with two or me substitutents covalently attached to the surface of said pigment; wherein said substitutents are non-randomly interspersed onto said pigment surface.

2. An ink according to claim 1, wherein said pigment surface comprises two or more localized areas; wherein one of said localized areas has hydrophilic substituents attached and another of said localized areas has hydrophobic substituents attached.

3. An ink according to claim 1 further comprising components selected from the group consisting of surfactants, co-solvents, buffers, biocides, colloids, viscosity modifiers, and mixtures thereof.

4. An ink according to claim 1, wherein said colorants are ink-jettable and have a mean diameter ranging from about 0.005 to about 12 um.

5. An ink according to claim 1, wherein said substitutents comprise hydrophilic moieties and hydrophobic moieties.

6. An ink according to claim 5, wherein said hydrophilic moieties are selected from palyacrylates and said hydrophobic moieties are selected from fluoropolymers.

7. An ink according to claim 5, wherein said hydrophobic moieties are selected from the group consisting of latex, silicon-containing moieties, polyvinylpyrrolidone, polyvinylalcohol, polysacchrides, metal chelators, and mixtures thereof.

8. An ink according claim 5, wherein said hydrophilic moieties are selected from the group consisting of carboxylate, phosphate, sulfonate, ammonium, quaternary ammonium, phosphonium moieties, and mixtures thereof.

9. A method of inkjet printing wherein an ink formulation is applied onto a media by means of a nonimpact printer; wherein said ink comprises an anisotropic ink wherein said anisotropic colorants of said ink comprises a pigment having a surface modified with two or more substituents covalently attached to the surface of said pigment; wherein said substitutents are non-randomly interspersed onto said pigment surface.

10. A method according to claim 9, wherein said pigment surface comprises two or more localized areas; wherein one of said localized areas has hydrophilic substituents attached and another of said localized areas has hydrophobic substituents attached.

11. A method according to claim 9, wherein said substitutents comprise hydrophilic moieties and hydrophobic moieties.

12. A method according to claim 9, further comprising components selected from the group consisting of surfactants, co-solvents, buffers, biocides, colloids, viscosity modifiers, and mixtures thereof.

13. A method of improving the waterfastness of an ink for inkjet printing comprising printing said ink onto a media; said ink comprises an anisotropic colorant with a surface wherein said anisotropic colorant has two or more localized areas on said anisotropic colorant surface and where one of said localized areas has hydrophilic substituents attached and another of said localized areas has hydrophobic substituents attached.

14. A method according to claim 13, wherein said hydrophilic substituents are selected from polyacrylates and said hydrophobic substituents are selected from fluoropolymers.

15. A method according to claim 13, wherein said hydrophobic substituents are selected from the group consisting of latex, silicon-containing moieties, polyvinylpyrrolidone, polyvinylalcohol, polysaccharides, metal chelators, and mixtures thereof.

16. A method according to claim 13, wherein said hydrophilic substituents are selected from the group consisting of carboxylate, phosphate, sulfonate, ammonium, quaternary ammonium, phosphonium moieties, and mixtures thereof.

* * * * *